(12) United States Patent
Perry

(10) Patent No.: US 11,965,439 B1
(45) Date of Patent: Apr. 23, 2024

(54) VARIABLE CAMSHAFT TIMING SUN GEAR CUSHION RING

(71) Applicant: BorgWarner Inc., Auburn Hills, MI (US)

(72) Inventor: Douglas Perry, Interlaken, NY (US)

(73) Assignee: BORGWARNER INC., Auburn Hills, MI (US)

(*) Notice: Subject to any disclaimer, the term of this patent is extended or adjusted under 35 U.S.C. 154(b) by 0 days.

(21) Appl. No.: 17/965,942

(22) Filed: Oct. 14, 2022

(51) Int. Cl.
*F01L 1/352* (2006.01)
*F01L 9/22* (2021.01)
*F16H 1/28* (2006.01)

(52) U.S. Cl.
CPC .......... *F01L 1/352* (2013.01); *F01L 9/22* (2021.01); *F16H 1/2863* (2013.01)

(58) Field of Classification Search
CPC ....... F01L 1/352; F01L 9/22; F01L 2820/032; F01L 2810/03; F16H 1/2863; F16H 2057/127; F16H 1/32; F16H 2001/327; F16H 2057/126; F16H 57/08–082
USPC .......................................................... 475/341
See application file for complete search history.

(56) References Cited

U.S. PATENT DOCUMENTS

| | | | | |
|---|---|---|---|---|
| 5,336,137 | A | * | 8/1994 | Kawakita .............. B60N 2/686 475/341 |
| 5,379,662 | A | * | 1/1995 | Livio .................. F16H 57/0406 74/468 |
| 7,624,710 | B2 | | 12/2009 | Uehama et al. |
| 9,664,254 | B2 | | 5/2017 | McCloy |
| 9,771,839 | B2 | | 9/2017 | Wing et al. |
| 10,233,999 | B2 | | 3/2019 | McCloy et al. |
| 10,344,825 | B2 | | 7/2019 | Wigsten |
| 10,605,332 | B2 | | 3/2020 | Pluta et al. |
| 2006/0236965 | A1 | | 10/2006 | Schaefer et al. |
| 2016/0348760 | A1 | * | 12/2016 | Wigsten .................. F01L 1/352 |
| 2018/0073598 | A1 | | 3/2018 | Pluta et al. |
| 2019/0010837 | A1 | | 1/2019 | Pritchard et al. |
| 2021/0017884 | A1 | | 1/2021 | Sano et al. |

FOREIGN PATENT DOCUMENTS

| | | | |
|---|---|---|---|
| JP | H05215191 A | 8/1993 | |
| JP | 2015132289 A | 7/2015 | |
| WO | WO-2012036033 A1 * | 3/2012 | .......... F16H 1/2836 |
| WO | 2020180829 A1 | 9/2020 | |
| WO | WO-2020180829 A1 * | 9/2020 | .............. F01L 1/352 |

* cited by examiner

*Primary Examiner* — Wesley G Harris
(74) *Attorney, Agent, or Firm* — REISING ETHINGTON P.C.

(57) ABSTRACT

An electrically-controlled camshaft phaser with a gearbox assembly, including a sun gear having outwardly-facing gear teeth; at least one planet gear, having outwardly-facing gear teeth, that moves radially relative to an axis of sun gear rotation; at least one pin that carries the planet gear; and a deformable outer ring, carried by the sun gear, that engages the planet gear and moves the planet gear radially toward a ring gear.

3 Claims, 6 Drawing Sheets

VARIABLE CAMSHAFT TIMING SUN GEAR CUSHION RING

TECHNICAL FIELD

The present application relates to electric motors and, more particularly, to gearboxes driven by an output shaft of an electric motor.

BACKGROUND

Internal combustion engines include camshafts that open and close valves regulating the combustion of fuel and air within combustion chambers of the engines. The opening and closing of the valves are carefully timed relative to a variety of events, such as the injection and combustion of fuel into the combustion chamber and the location of the piston relative to top-dead center (TDC). Camshaft(s) are driven by the rotation of the crankshaft via a drive member connecting these elements, such as a belt or chain. In the past, a fixed relationship existed between the rotation of the crankshaft and the rotation of the camshaft. However, internal combustion engines increasingly use camshaft phasers that vary the phase of camshaft rotation relative to crankshaft rotation. Variable camshaft timing (VCT) devices—camshaft phasers—can, in some implementations, be actuated by electric motors that advance or retard the opening/closing of valves relative to crankshaft rotation.

Electrically-actuated camshaft phasers typically include a gearbox assembly having an input and an output as well as an electric motor. The electric motor can couple to the input of the gearbox assembly while the output of the assembly can be coupled to a camshaft of an internal combustion engine. The components of the gearbox assembly can include a defined amount of space between them that is tolerated. As the gearbox assembly is used, the defined amount of space can cause backlash, which can increase as components wear with use. It would be helpful to be able to reduce this amount of space to minimize the amount of backlash in the gearbox assembly.

SUMMARY

In one implementation, an electrically-controlled camshaft phaser with a gearbox assembly, including a sun gear having outwardly-facing gear teeth; at least one planet gear, having outwardly-facing gear teeth, that moves radially relative to an axis of sun gear rotation; at least one pin that carries the planet gear; and a deformable outer ring, carried by the sun gear, that engages the planet gear and moves the planet gear radially toward a ring gear.

In another implementation, an electrically-controlled camshaft phaser with a gearbox assembly, including a sun gear having outwardly-facing gear teeth in between one axial end and another axial end of the sun gear; a circumferential groove formed in the sun gear between the axial ends; at least one planet gear, having outwardly-facing gear teeth, that moves radially relative to an axis of sun gear rotation; at least one pin that carries the planet gear; and a deformable outer ring, received within the circumferential groove, that engages the planet gear and moves the planet gear radially toward a ring gear.

In yet another implementation, an electrically-controlled camshaft phaser with a gearbox assembly, including a sun gear having outwardly-facing gear teeth; at least one planet gear, having outwardly-facing gear teeth, that moves radially relative to an axis of sun gear rotation; at least one pin that carries the planet gear; an axial section of the sun gear adjacent a radial face of the gear teeth; a first deformable outer ring carried by the axial section; and a second deformable outer ring carried by the sun gear adjacent an opposite radial face of the gear teeth, wherein the first deformable outer ring and the second deformable outer ring engage the planet gear and move the planet gear radially toward a ring gear.

DETAILED DESCRIPTION

A gearbox assembly included with an electrically-controlled camshaft phaser can include a sun gear having a resiliently deformable outer ring that is outwardly facing and engages with one or more planet gears to urge the planet gear(s) radially-outwardly toward ring gears. The outer ring can engage the planet gear(s) in one of a variety of different positions. For example, the outer ring can engage the teeth of the planet gear or the outer ring can engage a hub of the planet gear. In one implementation, the planet gears can rotate about pins that move radially outwardly and inwardly relative to the sun gear so that they can be moved into engagement with the ring gears by the outer ring. Or in another implementation, the planet pins are fixed so that the pins do not move radially. An inner diameter of the planet gear can be slightly larger than an outer diameter of the planet pin. The outer ring can bias the planet gear radially outwardly relative to the planet pin. The outer ring can be formed from an elastomeric material that resists compression and forces the planet gear(s) radially outwardly toward and into engagement with ring gears. The force exerted by the outer ring can reduce lash in the gearbox. Due to the interface between a sun gear and one or more planet gears, an amount of backlash exists. The backlash can range from negative (unwanted binding) to an undesirable high level because of manufacturing tolerances. The outer ring in the present disclosure has the ability to control a center distance to have zero backlash while avoiding the negative binding. An added benefit is that the outer ring can also compensate for component wear that would otherwise lead to an increase in backlash as the camshaft phaser is used.

Figure 1:
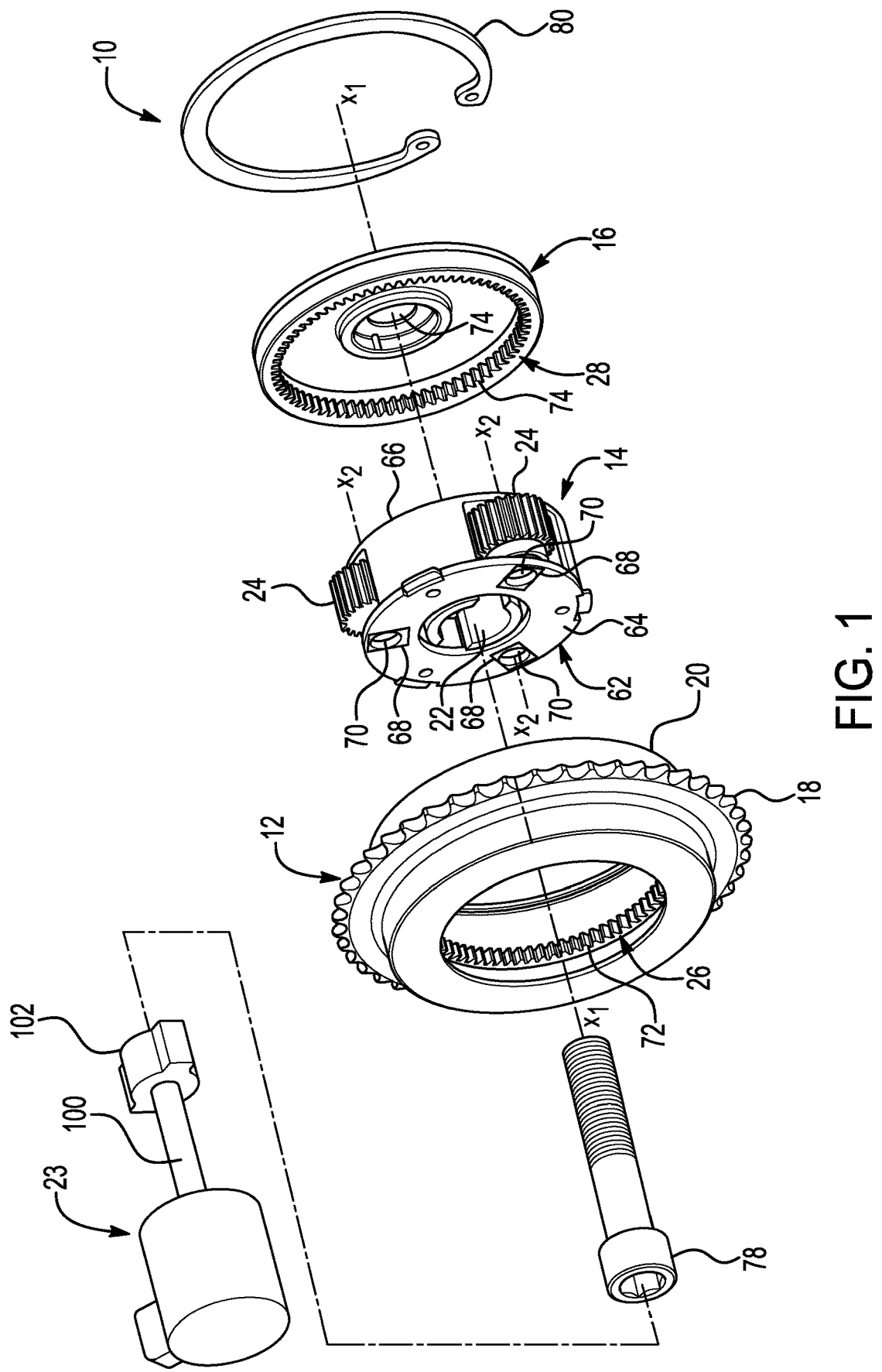
FIG. 1 is a perspective exploded view depicting an implementation of an electrically-controlled camshaft phaser.
Figure 2:
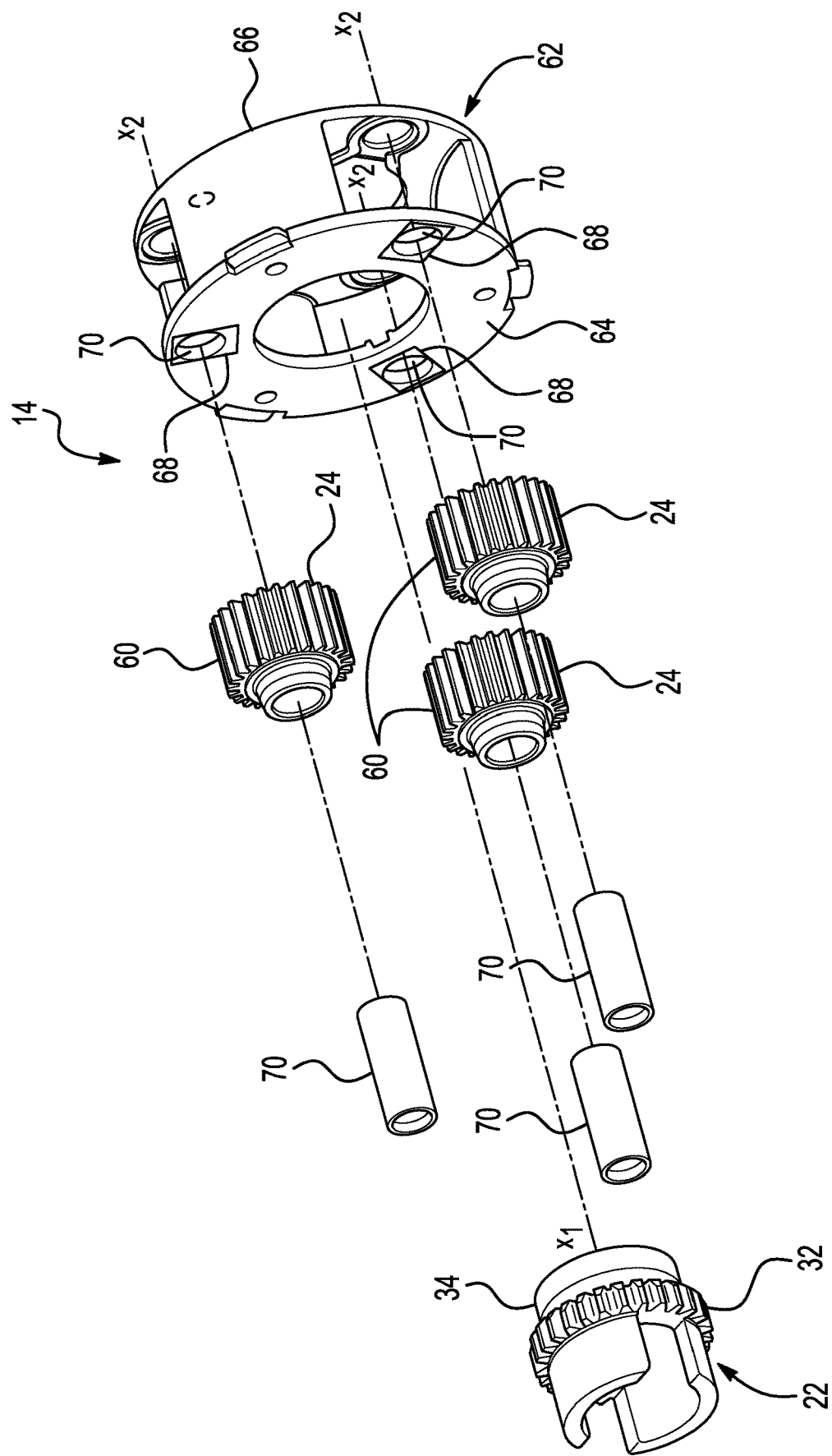
FIG. 2 is a perspective exploded view depicting a portion of an implementation of an electrically-controlled camshaft phaser.
Figure 3:
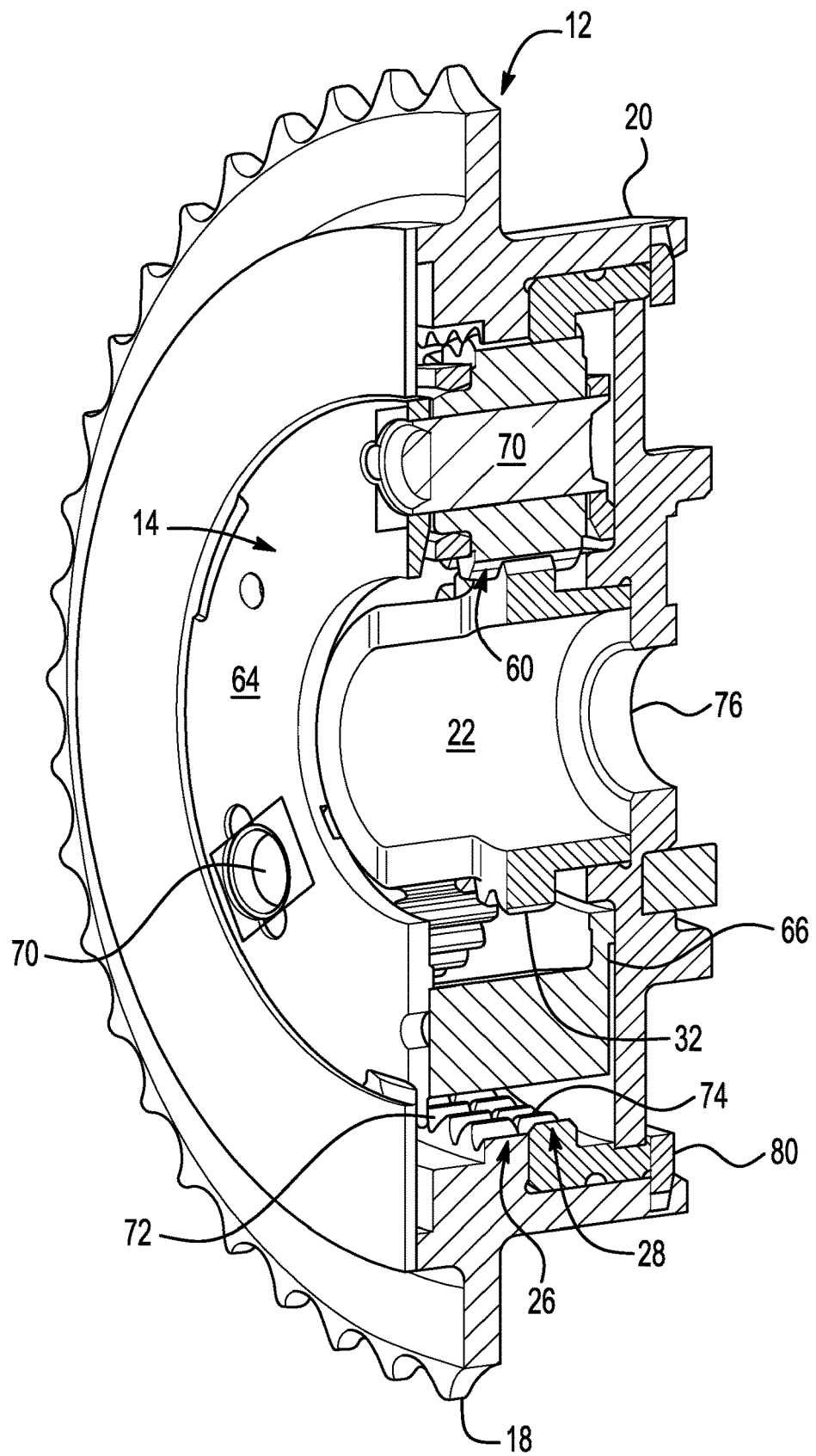
FIG. 3 is a perspective cross-sectional view depicting a portion of an implementation of an electrically-controlled camshaft phaser.
Figure 4:
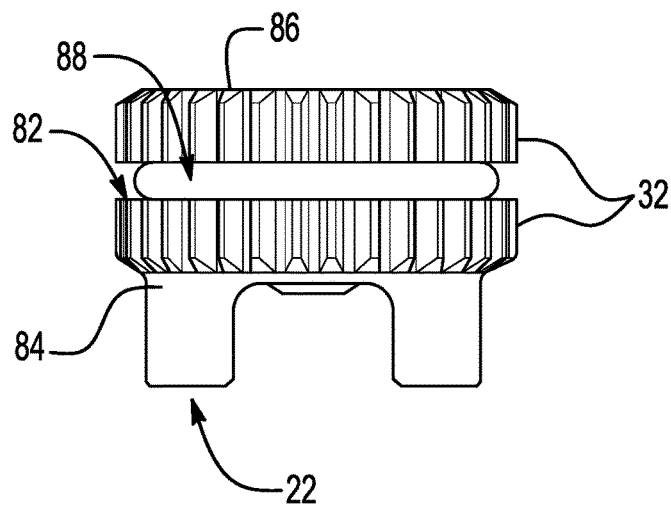
FIG. 4 is a profile view depicting an implementation of a sun gear and an outer ring.
Figure 5:
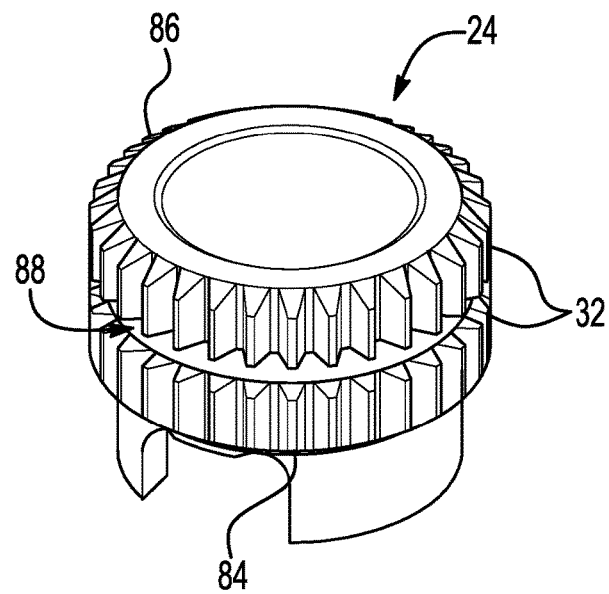
FIG. 5 is a perspective view depicting an implementation of a sun gear and an outer ring.
Figure 6:
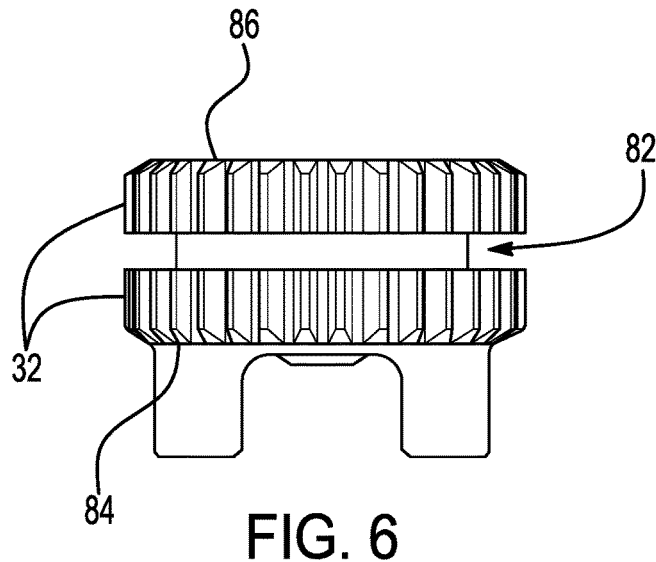
FIG. 6 is a profile view depicting an implementation of a sun gear and a circumferential groove.
Figure 7:
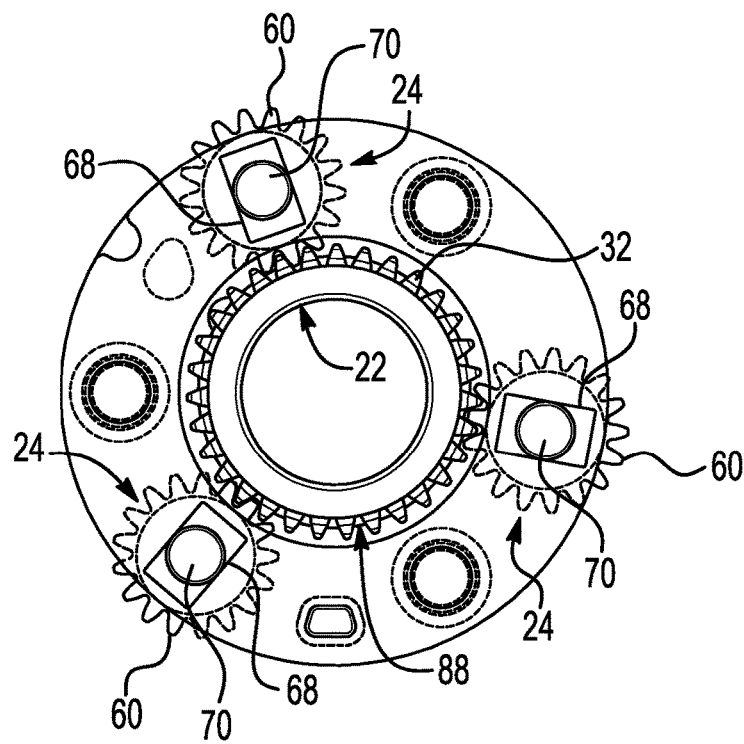
FIG. 7 is a perspective view depicting a portion of an implementation of an electrically-controlled camshaft phaser.

An embodiment of an electrically-actuated VCT assembly 10 (also referred to as an electrically-controlled camshaft phaser or "phaser") is shown with respect to FIGS. 1-3. The phaser 10 is a multi-piece mechanism with components that work together to transfer rotation from the engine's crankshaft and to the engine's camshaft, and that can work together to angularly displace the camshaft relative to the crankshaft for advancing and retarding engine valve opening and closing. The phaser 10 can have different designs and constructions depending upon, among other possible factors, the application in which the phaser is employed and the crankshaft and camshaft that it works with. In the embodiment presented in FIGS. 1-3, for example, the phaser 10 includes a sprocket 12, a planetary gear assembly 14, and a camshaft plate or plate 16.

The sprocket 12 receives rotational drive input from the engine's crankshaft and rotates about an axis $x_1$. A timing chain or a timing belt can be looped around the sprocket 12 and around the crankshaft so that rotation of the crankshaft translates into rotation of the sprocket via the chain or belt. Other techniques for transferring rotation between the sprocket 12 and crankshaft are possible. Along an outer surface, the sprocket 12 has a set of teeth 18 for mating with the timing chain, with the timing belt, or with another component. In different examples, the set of teeth 18 can include thirty-eight individual teeth, forty-two individual teeth, or some other quantity of teeth spanning continuously around the circumference of the sprocket 12. As illustrated, the sprocket 12 has a housing 20 spanning axially from the set of teeth 18. The housing 20 is a cylindrical wall that surrounds part of the planetary gear assembly 14.

A planetary gear stop can be included to limit the angular displacement between the camshaft and the crankshaft. The planetary gear stop can engage a portion of the planetary gear assembly 14 and prevent further angular displacement between the camshaft and the crankshaft in both an advancing direction and a retarding direction. It should be appreciated that the planetary gear stop can be implemented in a number of different ways. A variety of different planetary gear stops are described in U.S. patent application Ser. No. 15/635,281, the entirety of which is incorporated by reference.

In the embodiment presented here, the planetary gear assembly 14 includes planet gears 24. A sun gear 22 is driven by an electric motor 23 for rotation about the axis $X_1$. The sun gear 22 engages with the planet gears 24 and has a set of teeth 32 at its exterior that makes direct teeth-to-teeth meshing with the planet gears 24. In different examples, the set of teeth 32 can include twenty-six individual teeth, thirty-seven individual teeth, or some other quantity of teeth spanning continuously around the circumference of the sun gear 22. A skirt 34 in the shape of a cylinder spans from the set of teeth 32. As described, the sun gear 22 is an external spur gear, but could be another type of gear. The electric motor 23 includes a stator and a rotor (not shown). The rotor can be coupled to a motor shaft 100 to prevent angular movement of the rotor relative to the motor shaft 100. Electric current can be received by windings included with the stator to induce rotational movement of the rotor relative to the stator. The rotational movement of the rotor is communicated to the motor shaft 100.

The planet gears 24 rotate about their individual rotational axes $x_2$ when in the midst of bringing the engine's camshaft among advanced and retarded angular positions. When not advancing or retarding, the planet gears 24 revolve together around the axis $x_1$ with the sun gear 22 and with the ring gears 26, 28. In the embodiment presented here, there are a total of three discrete planet gears 24 that are similarly designed and constructed with respect to one another, but there could be other quantities of planet gears such as one, two, four or six. However many there are, each of the planet gears 24 can engage with first and second ring gears 26, 28, included with the sprocket 12 and the plate 16, respectively. Each planet gear 24 can have a set of teeth 60 along its exterior for making direct teeth-to-teeth meshing with the ring gears 26, 28. In different examples, the teeth 60 can include twenty-one individual teeth, or some other quantity of teeth spanning continuously around the circumference of each of the planet gears 24. To hold the planet gears 24 in place and support them, a carrier assembly 62 can be provided. The carrier assembly 62 can have different designs and constructions. In the embodiment presented in the figures, the carrier assembly 62 includes a first carrier plate 64 on one side, a second carrier plate 66 on the other side, and slots 68 that serve as a hub for the rotating planet gears 24. Planet pins or bolts 70 can be used with the carrier assembly 62. The slots 68 can receive the pins 70 and permit the radial movement of the planet gears 24 toward and away from the sun gear 22 relative to axis $x_1$. It should be appreciated that other implementations of the planetary gear assembly are possible and that term should be understood to include other such implementations. Implementations having one ring gear and a planet gear attached to a camshaft via a coupling are possible as well.

The first ring gear 26 receives rotational drive input from the sprocket 12 so that the first ring gear 26 and sprocket 12 rotate together about the axis $x_1$ in operation. The first ring gear 26 can be a unitary extension of the sprocket 12—that is, the first ring gear 26 and the sprocket 12 can together form a monolithic structure. The first ring gear 26 has an annular shape, engages with the planet gears 24, and has a set of teeth 72 at its interior for making direct teeth-to-teeth meshing with the planet gears 24. In different examples, the teeth 72 can include eighty individual teeth, or some other quantity of teeth spanning continuously around the circumference of the first ring gear 26. In the embodiment presented here, the first ring gear 26 is an internal spur gear, but could be another type of gear.

The second ring gear 28 transmits rotational drive output to the engine's camshaft about the axis $x_1$. In this embodiment, the second ring gear 28 drives rotation of the camshaft via the plate 16. The second ring gear 28 and plate 16 can be connected together in different ways, including by a cutout-and-tab interconnection, press-fitting, welding, adhering, bolting, riveting, or by another technique. In embodiments not illustrated here, the second ring gear 28 and the plate 16 could be unitary extensions of each other to make a monolithic structure. Like the first ring gear 26, the second ring gear 28 has an annular shape, engages with the planet gears 24, and has a set of teeth 74 at its interior for making direct teeth-to-teeth meshing with the planet gears. In different examples, the teeth 74 can include seventy-seven individual teeth, or some other quantity of teeth spanning continuously around the circumference of the second ring gear 28. With respect to each other, the number of teeth between the first and second ring gears 26, 28 can differ by a multiple of the number of planet gears 24 provided. So, for instance, the teeth 72 can include eighty individual teeth, while the teeth 74 can include seventy-seven individual teeth-a difference of three individual teeth for the three planet gears 24 in this example. In another example with six planet gears, the teeth 72 could include seventy individual teeth, while the teeth 74 could include eighty-two individual teeth. Satisfying this relationship furnishes the advancing and retarding capabilities by imparting relative rotational movement and relative rotational speed between the first and second ring gears 26, 28 in operation. In the embodiment presented here, the second ring gear 28 is an internal spur gear, but could be another type of gear. The plate 16 includes a central aperture 76 through which a center bolt 78 passes to fixedly attach the plate 16 to the camshaft. In addition, the plate 16 is also secured to the sprocket 12 with a snap ring 80 that axially constrains the planetary gear assembly 14 between the sprocket 12 and the plate 16.

Together, the two ring gears 26, 28 constitute a split ring gear construction for the camshaft phaser 10. However, it should be appreciated that other camshaft phaser designs can be used with the cushioned stops. For example, the camshaft phaser could be implemented using an eccentric shaft, a compound planet gear, and two ring gears. Or the camshaft phaser could include more than two ring gears. For instance, the camshaft phaser 10 could include an additional third ring gear for a total of three ring gears. Here, the third ring gear could also transmit rotational drive output to the engine's camshaft like the second ring gear 28, and could have the same number of individual teeth as the second ring gear.

Turning to FIGS. 4-7, an implementation of the sun gear 22 is shown. The sun gear 22 includes a circumferential groove 82 that bifurcates the teeth 32 such that the groove 82 is located in between one axial end 84 of the sun gear 22 and another axial end 86 of the sun gear 22. The groove 82 can have a cross sectional shape that closely conforms to the cross-sectional shape of the resiliently deformable outer ring 88. The outer ring 88 can be formed from any one of a variety of different materials, such as an elastomeric material, that is compressible and when loaded provides an opposite-direction return force. The surface of the outer ring 88 can engage the teeth 60 of one or more planet gears 24 to urge the planet gear(s) 24 radially-outwardly toward ring gears 26, 28. As the outer ring engages the teeth 60 of the planet gear(s) 24, the pins 70 carrying the planet gears 24 can move radially-outwardly within the slots 68 toward the teeth 72, 74 of the first and second ring gears 26, 28. The diameter of the outer ring 88 can closely conform to a base diameter of the sun gear 22 and/or the circumferential groove 82, but the cross-sectional size of the outer ring 88 can be selected based on the amount of radial-outward force desired from the sun gear 22 on the planet gears 24.

Figure 8:
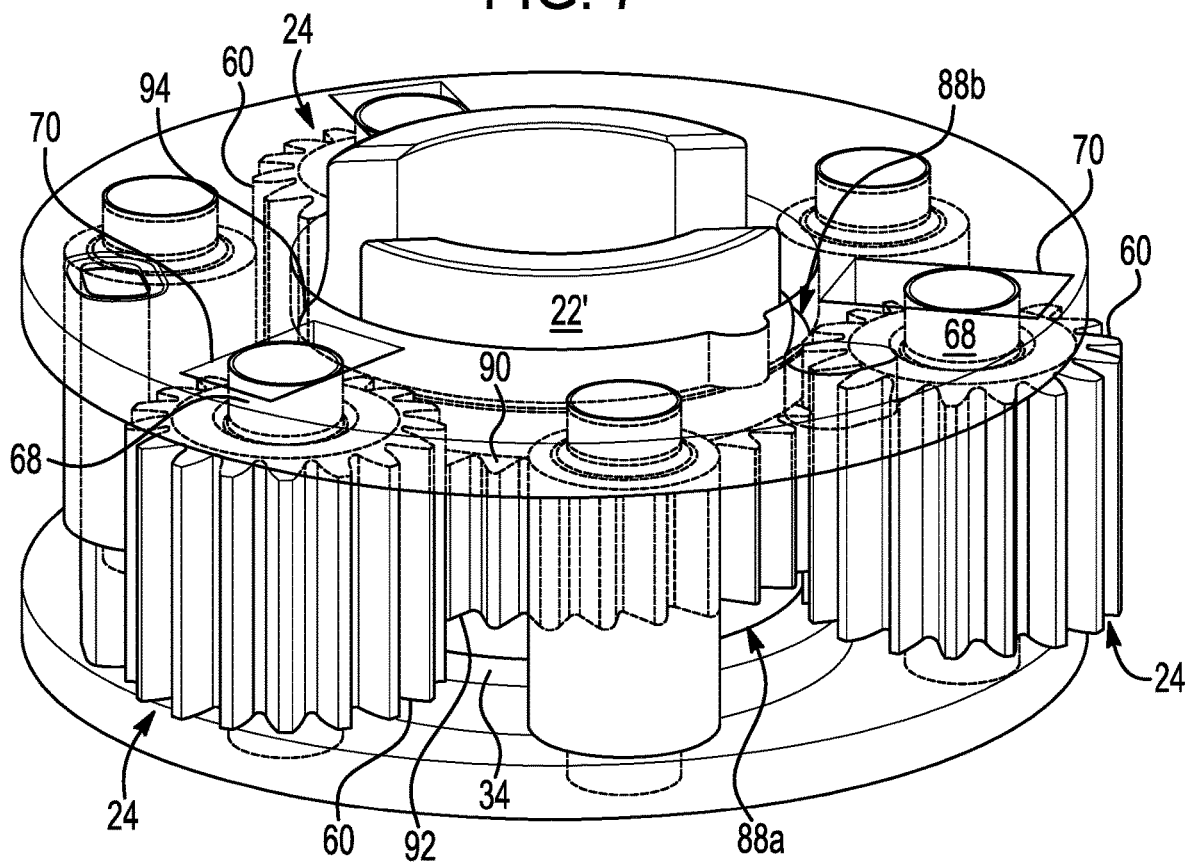
FIG. 8 is a perspective view depicting a portion of an implementation of an electrically-controlled camshaft phaser.

Turning to FIG. 8, another implementation of sun gear 22' and planet gears 24 is shown. The sun gear 22' includes a plurality of outer rings 88 on opposite sides of the sun gear teeth 32. A first outer ring 88a can be positioned on the skirt 34 such that the ring 88a abuts a radial face 90 of the gear teeth 32. A second outer ring 88b can be positioned adjacent an opposite radial face 92 of the gear teeth 32; a location that is also adjacent to motor shaft 100. An axial section 94 of the sun gear 22, adjacent to where the motor shaft 100 provides input to the sun gear 22, can include a surface for receiving the second outer ring 88b. The surface of the first outer ring 88a and the surface of the second outer ring 88b can both engage the teeth 60 of the planet gear(s) 24 and urge the planet gear(s) 24 radially-outwardly toward ring gears 26, 28. As the first outer ring 88a and the second outer ring 88b engage the teeth 60 of the planet gear(s) 24, the pins 70 carrying the planet gears 24 can move radially-outwardly within the slots 68 toward the teeth 72, 74 of the first and second ring gears 26, 28.

Figure 9:
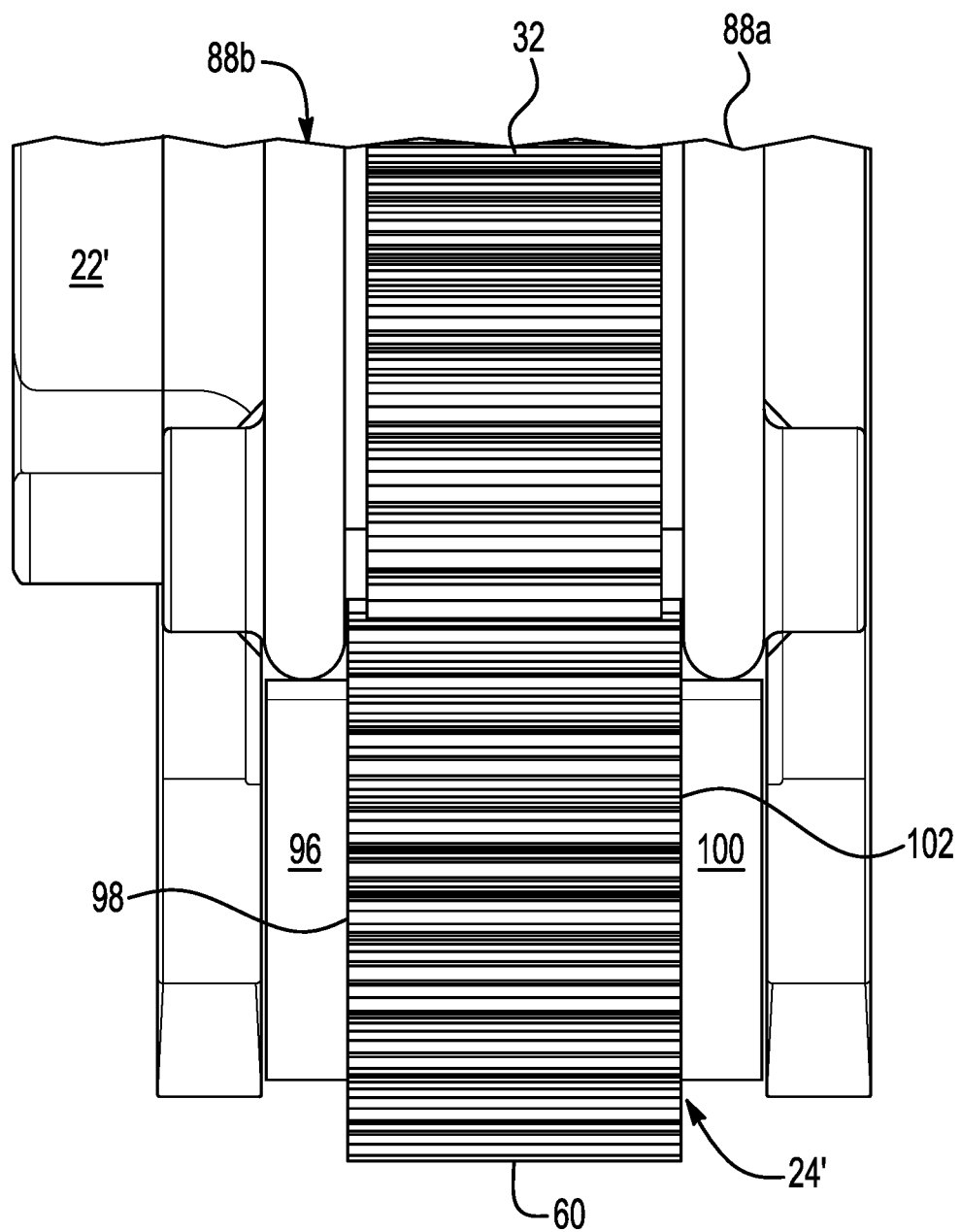
FIG. 9 is a perspective view depicting a portion of an implementation of an electrically-controlled camshaft phaser.

Turning to FIG. 9, another implementation of sun gear 22' and planet gears 24' is shown. The sun gear 22' includes a plurality of outer rings 88 on opposite sides of the sun gear teeth 32. The first outer ring 88a can be positioned on the skirt 34 such that the ring 88a abuts a radial face 90 of the gear teeth 32. The second outer ring 88b can be positioned adjacent an opposite radial face 92 of the gear teeth 32; a location that is also adjacent to motor shaft 100. An axial section 94 of the sun gear 22, adjacent to where the motor shaft 100 provides input to the sun gear 22, can include a surface for receiving the second outer ring 88b. Planet gears 24' can include a first hub surface 96 adjacent a radial gear face 98 of teeth 60 and a second hub surface 100 adjacent an opposite radial gear face 102 of teeth 60. The first and second hub surfaces 96, 100 can extend circumferentially around the pin 68 and may be configured to engage the first and second outer rings 88a, 88b, respectively. The surface of the first outer ring 88a and the surface of the second outer ring 88b can both engage the first and second hub surfaces 96, 100 of the planet gear(s) 24' and urge the planet gear(s) 24' radially-outwardly toward ring gears 26, 28. As the first outer ring 88a and the first and second hub surfaces 96, 100 of the planet gear(s) 24', the pins 70 carrying the planet gears 24' can move radially-outwardly within the slots 68 toward the teeth 72, 74 of the first and second ring gears 26, 28.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. An electrically-controlled camshaft phaser with a gearbox assembly, comprising:
   a sun gear having outwardly-facing gear teeth in between one axial end and another axial end of the sun gear;
   a circumferential groove formed in the sun gear between the axial ends;
   at least one planet gear, having outwardly-facing gear teeth, that moves radially relative to an axis of the sun gear rotation;
   at least one pin that carries the at least one planet gear; and
   a deformable outer ring formed from a compressible material that when the compressible material is compressed provides an opposite-direction return force, received within the circumferential groove, that engages the at least one planet gear and moves the at least one planet gear radially toward a ring gear in response to the opposite-direction return force, wherein the deformable outer ring engages a hub surface of the at least one planet gear.

2. The electrically-controlled camshaft phaser recited in claim 1, wherein the deformable outer ring is formed from an elastomeric material.

3. The electrically-controlled camshaft phaser recited in claim 1, further comprising a plurality of planet gears.

\* \* \* \* \*